US011059396B2

(12) United States Patent
Zhao

(10) Patent No.: US 11,059,396 B2
(45) Date of Patent: Jul. 13, 2021

(54) DIVING CUSHION FOR A REVERSIBLE SEAT

(71) Applicant: Magna Seating Inc, Aurora (CA)

(72) Inventor: Kai Zhao, Rochester Hills, MI (US)

(73) Assignee: Magna Seating Inc, Aurora (CA)

( * ) Notice: Subject to any disclaimer, the term of this patent is extended or adjusted under 35 U.S.C. 154(b) by 109 days.

(21) Appl. No.: 16/371,238

(22) Filed: Apr. 1, 2019

(65) Prior Publication Data

US 2019/0299819 A1 Oct. 3, 2019

Related U.S. Application Data

(60) Provisional application No. 62/650,364, filed on Mar. 30, 2018.

(51) Int. Cl.
*B60N 2/20* (2006.01)
*B61D 33/00* (2006.01)

(52) U.S. Cl.
CPC .......... *B60N 2/203* (2013.01); *B61D 33/0028* (2013.01)

(58) Field of Classification Search
CPC ............................ B60N 2/203; B61D 33/0028
See application file for complete search history.

(56) References Cited

U.S. PATENT DOCUMENTS 512,539 A * 1/1894 Cushing ................ B60N 2/203 297/95
613,423 A * 11/1898 Pickles ............. B61D 33/0028 297/96
615,227 A * 11/1898 Pickles .................. B60N 2/203 297/101
1,096,678 A * 5/1914 Budd .................. B60N 2/1828 297/99
1,488,659 A * 4/1924 Abel .................. B61D 33/0028 297/73
1,782,231 A * 11/1930 Cross ................ B61D 33/0028 297/95
1,968,434 A * 7/1934 Bell ..................... B60N 2/1839 297/99
3,265,435 A * 8/1966 Bilancia ................. B60N 2/203 297/101
3,877,746 A * 4/1975 Christine ............... B60N 2/242 297/95
4,081,051 A * 3/1978 Logsdon ................ B60N 2/203 180/331
4,322,052 A * 3/1982 Hodge ................... B60N 2/203 180/330
5,076,640 A * 12/1991 Bulte ..................... B61D 33/00 297/101

(Continued)

FOREIGN PATENT DOCUMENTS

DE 2527047 1/1977
EP 0621833 4/1996

*Primary Examiner* — David R Dunn
*Assistant Examiner* — Tania Abraham
(74) *Attorney, Agent, or Firm* — Miller Canfield

(57) ABSTRACT

A reversible seat assembly for use in an automotive vehicle has a seat cushion, a seat back and a linkage. The linkage operatively couples the seat back with the seat cushion. The linkage moves the seat back between one of a forward-facing position and a rearward-facing position. The linkage lowers the seat cushion when the seat back is moved towards a central position between the forward-facing position and the rearward-facing position.

9 Claims, 4 Drawing Sheets

(56) References Cited

U.S. PATENT DOCUMENTS

| | | | | |
|---|---|---|---|---|
| 5,322,341 | A * | 6/1994 | Harrison | B60N 2/203 297/364 |
| 5,362,124 | A * | 11/1994 | Schlidt | B60N 2/02 297/101 |
| 6,179,375 | B1 * | 1/2001 | Lane | B60N 2/203 297/103 |
| 6,715,825 | B2 * | 4/2004 | Tame | B60N 2/203 297/101 |
| 7,300,107 | B2 | 11/2007 | Kammerer | |
| 7,644,982 | B2 | 1/2010 | Paluch | |
| 9,150,178 | B1 * | 10/2015 | Jayasuriya | B60R 22/023 |
| 2014/0138991 | A1 * | 5/2014 | Deimen | B64D 11/0601 297/101 |

* cited by examiner 10
14
20
28
30
24
26
18
12
16
22
32
34

50
72
56
58
108
82
110
84
112
52
64
62
86
100
118
116
88
68
70
120
90
114
122
92
98
54
66
76
106
96
94
74

50
52
54
56
60
62
64
66
68
70
72
74
76
78
80
86
88
90
92
94
96
98
100
102
104
106
112
114
116
118
120
122

DIVING CUSHION FOR A REVERSIBLE SEAT

CROSS-REFERENCE TO RELATED APPLICATIONS

This application claims priority to U.S. provisional patent application No. 62/650,364, filed Mar. 30, 2018, which is incorporated herein by reference.

TECHNICAL FIELD

Example embodiments relate to a reversible seat assembly for an automotive vehicle.

BACKGROUND

Reversible seat assemblies for use in automotive vehicles are well known in the art. For example, U.S. Pat. Nos. 6,715,825 and 7,644,982, which are incorporated herein by reference, disclose seat assemblies that allow a user to position the seat back between a forward-facing position and a rearward-facing position. The seat assembly in U.S. Pat. No. 7,644,982 includes a pair of links 94, 96 for positioning the seat back 14 between a forward-facing position A and a rearward-facing position B. The seat assembly also includes a cushion control mechanism consisting of a pair of forward 200 and rearward 202 linkages for automatically controlling the seat cushion incline angle in response to movement of the seat back.

FIG. 1 illustrates another reversible seat assembly 10 for use in an automotive vehicle in accordance with the prior art. The seat assembly 10 includes a seat cushion 12 and a seat back 14 operatively coupled to the seat cushion 12 for supporting a seat occupant in a generally upright seating position. The seat cushion 12 includes a cushion frame 16 and a cushion pad 18, and the seat back 14 includes a recliner bracket 20. The seat cushion 12 is supported above a floor in the vehicle by a seat riser 22. Reversing links 24, 26 extend between an upper end pivotally coupled to the recliner bracket 20 at pivots 28, 30 respectively, and a lower end pivotally coupled to the seat riser 22 at pivots 32, 34 respectively.

As depicted in FIG. 1, in these prior art reversible seat assemblies 10, during the transition between the forward-facing position and the rearward-facing position, the recliner bracket 20 would pass alongside the seat cushion 12. Due to the overlap between the recliner bracket 20 and the seat cushion 12, the seat cushion 12 has to be narrowed to avoid contact with the recliner bracket 20 during the reversing process. A narrower seat is less comfortable for an occupant.

SUMMARY

The present invention avoids contact between the seat cushion and the recliner bracket by lowering the seat cushion during the reversing process so that the recliner bracket can pass above the seat cushion rather than alongside it as it traverses from one side of the cushion to the other. Because the recliner bracket clears the seat cushion from above, the cushion does not need to be narrowed to avoid contact with the recliner bracket.

According to one embodiment, there is provided a reversible seat assembly for use in an automotive vehicle. The seat assembly comprises a seat cushion, a seat back, and a linkage. The linkage operatively couples the seat back with the seat cushion. The linkage moves the seat back between one of a forward-facing position and a rearward-facing position, and the linkage lowers the seat cushion when the seat back is moved towards a central position between the forward-facing position and the rearward-facing position.

According to another embodiment, there is provided a reversible seat assembly for use in an automotive vehicle. The seat assembly comprises a seat riser, a seat cushion, a seat back, and a plurality of reversing links. The seat cushion extends between a front end and a rear end. The seat back comprises a recliner bracket. The plurality of reversing links extend between an upper end pivotally coupled to the recliner bracket and a lower end pivotally coupled to the seat riser. The seat cushion is operatively coupled to the seat riser for movement between a first position when the seat back is adjacent the rear end of the seat cushion and a second position where the seat cushion is below the recliner bracket when the seat back is between the rear and front ends of the seat cushion.

According to another embodiment, there is provided a reversible seat assembly for use in an automotive vehicle. The seat assembly comprises a seat riser, a seat cushion, a cushion frame link, a seat back, and a plurality of reversing links. The seat cushion extends between a front end and a rear end, and comprises a cushion frame. The cushion frame link extends between an upper end pivotally coupled to the cushion frame between the front and rear ends and a lower end that travels along an arc slot on the seat riser. The seat back comprises a recliner bracket. The plurality of reversing links extend between an upper end pivotally coupled to the recliner bracket and a lower end pivotally coupled to the seat riser. The lower end of the cushion frame link is positioned near an end of the arc slot when the seat back is adjacent the rear or front end of the seat cushion, and the lower end of the cushion frame link is positioned near a center of the arc slot when the seat back is between the rear and front ends of the seat cushion.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXAMPLE EMBODIMENTS

Figure 1:
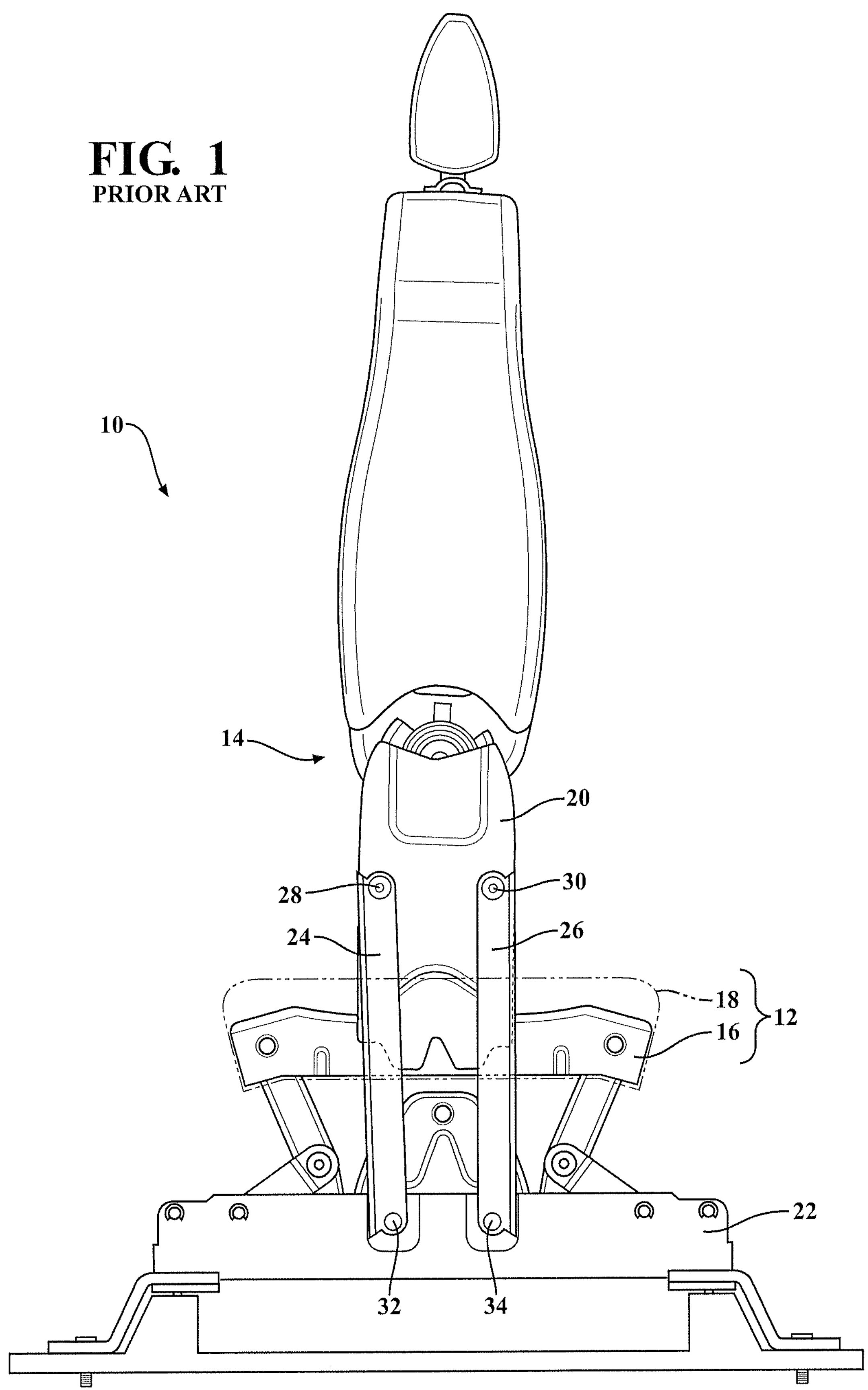
FIG. 1 is a fragmentary side view of a reversible seat assembly in a neutral position in accordance with the prior art.
Figure 2:
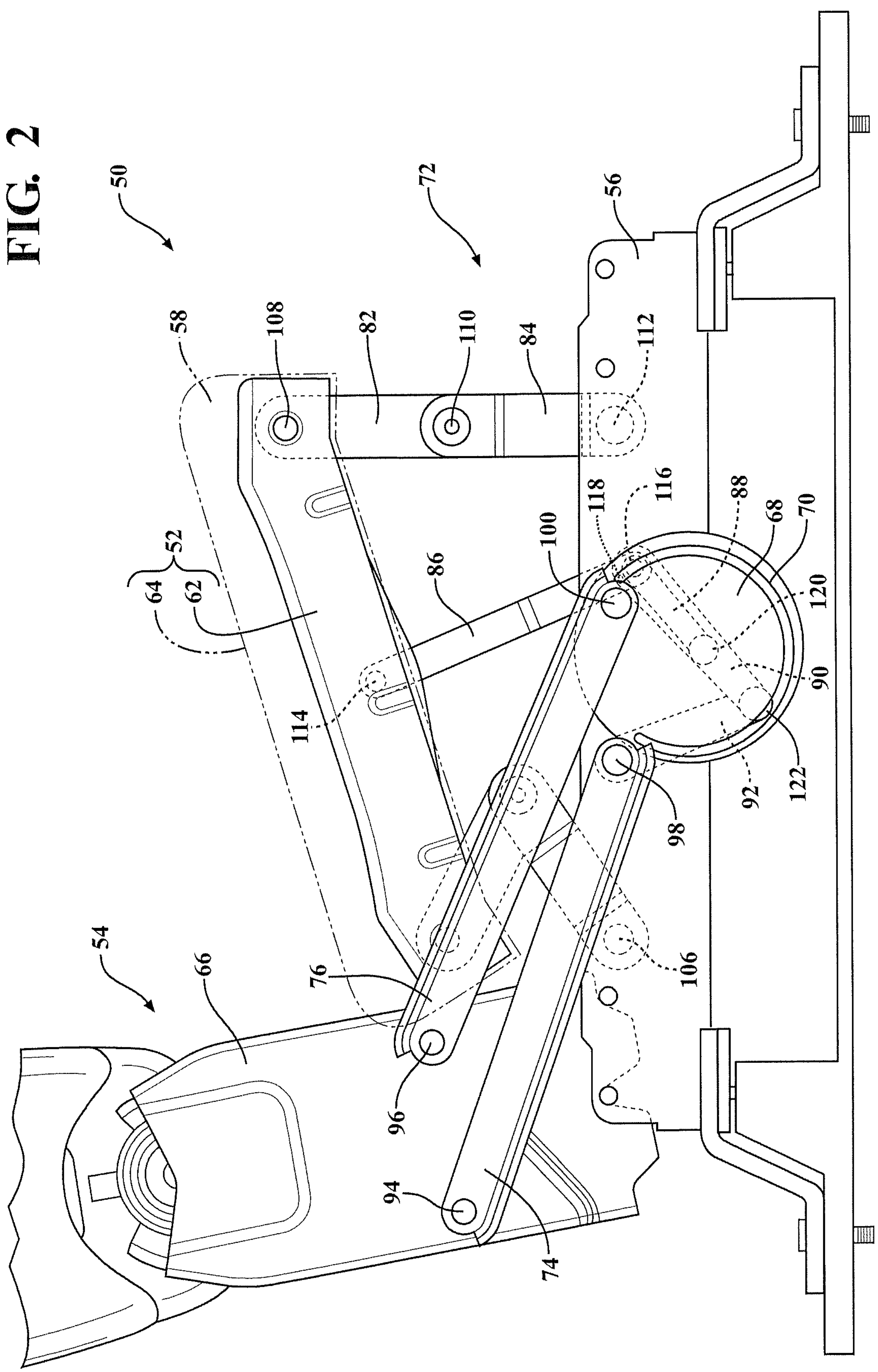
FIG. 2 is a fragmentary side view of the reversible seat assembly in the forward-facing seating position in accordance with one embodiment of the present disclosure.
Figure 3:
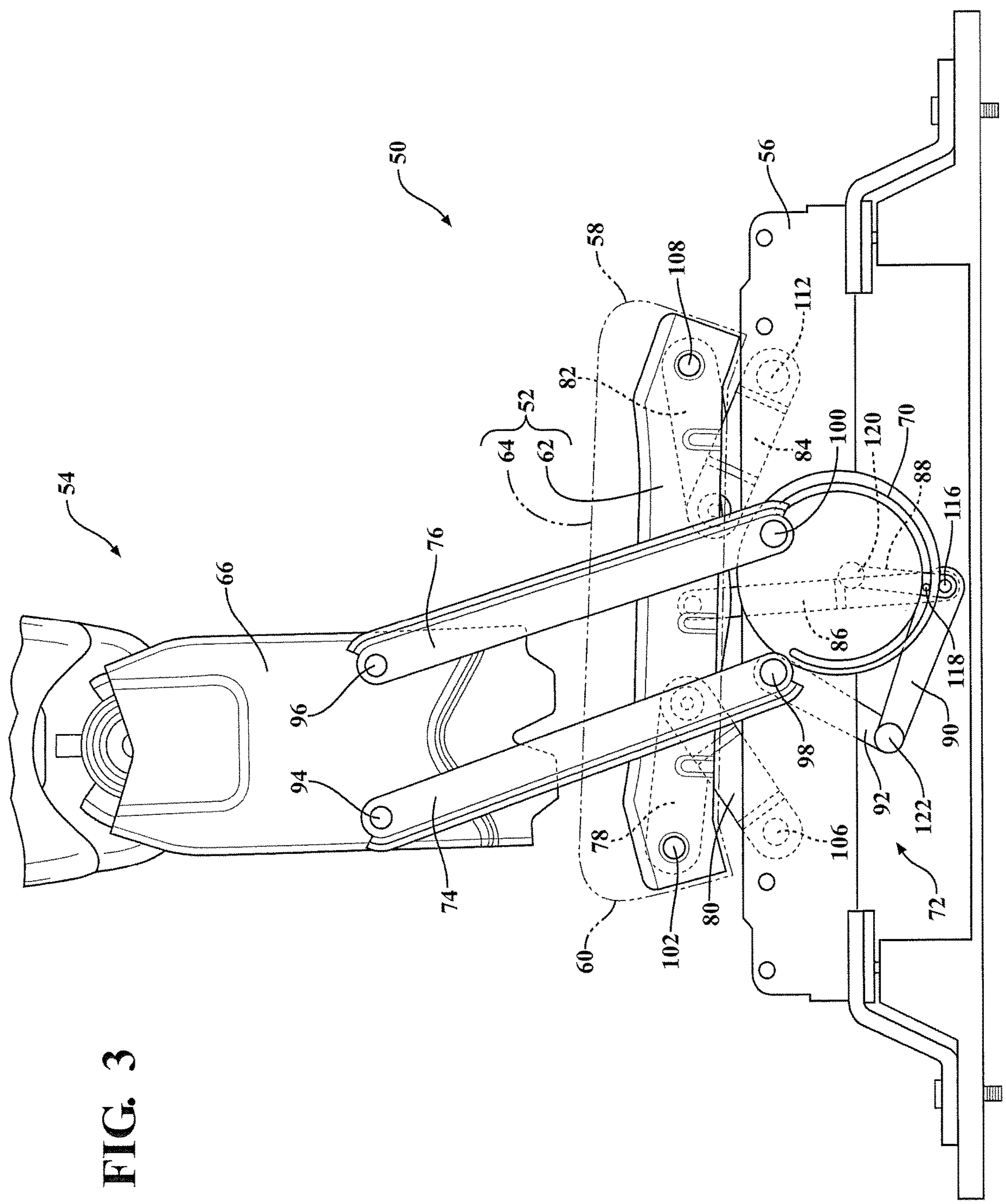
FIG. 3 is a fragmentary side view of the reversible seat assembly of FIG. 2 in a neutral position.
Figure 4:
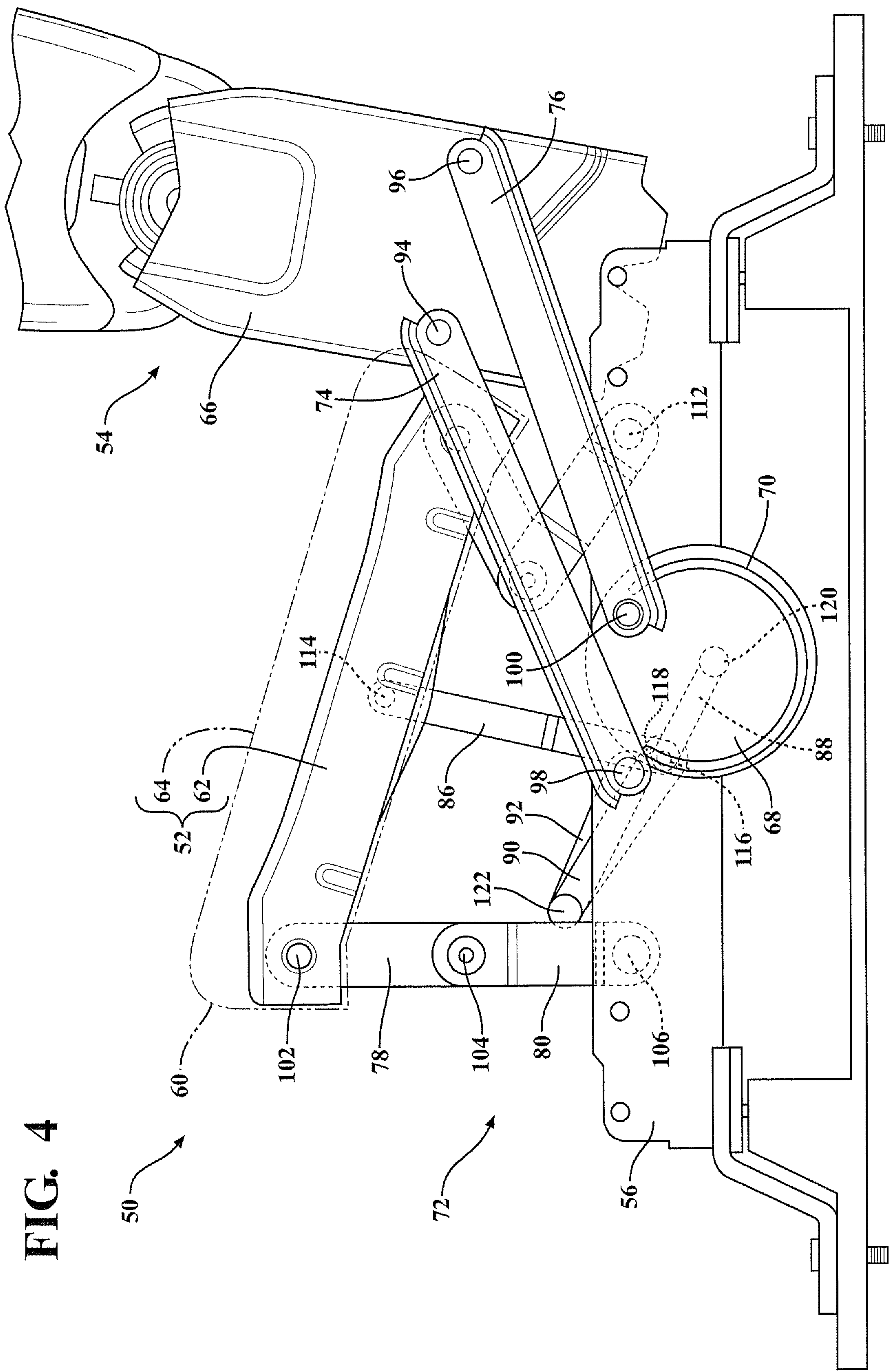
FIG. 4 is a fragmentary side view of the reversible seat assembly of FIG. 2 in the rearward-facing seating position.

FIGS. 2-4 illustrate one embodiment of a reversible seat assembly 50 for use in an automotive vehicle. The seat assembly 50 includes a seat cushion 52 and a seat back 54 operatively coupled to the seat cushion 52 for supporting a seat occupant in a generally upright seating position. The seat cushion 52 is supported above a floor in the vehicle by an outboard seat riser 56 and an inboard seat riser (not shown). Although the Figures and description below refer to the outboard side of the seat assembly 50, the present invention includes corresponding structures on the inboard side of the seat assembly, as is well known in the art.

The seat cushion 52 extends between a front end 58 and an opposite rear end 60, and includes a cushion frame 62 and a cushion pad 64. The seat back 54 includes a recliner bracket 66. Seat riser 56 includes a circular plate 68 with an arc slot 70. The circular plate 68 may be formed as part of the seat riser 56. Alternatively, the plate 68 may be welded to form the seat riser 56.

The seat assembly 50 also includes a seat cushion control mechanism or linkage, generally shown at 72, for controlling the position of the cushion frame 62, and therefore the seat cushion 52, in response to movement of the seat back 54 between the forward-facing seating position and the rearward-facing seating position. The control mechanism 72 is a single degree-of-freedom system, and includes reversing links 74, 76, a cushion rear upper link 78, a cushion rear lower link 80, a cushion front upper link 82, a cushion front lower link 84, a cushion frame link 86, a cushion center short link 88, a cushion center long link 90, and a cushion four-bar link 92.

Reversing links 74, 76 extend between an upper end pivotally coupled to the recliner bracket 66 at pivots 94, 96 respectively, and a lower end pivotally coupled to the seat riser 56 at pivots 98, 100 respectively.

The cushion rear upper link 78 is pivotally coupled to the cushion frame 62 at pivot 102. The cushion rear upper link 78 is pivotally coupled to the cushion rear lower link 80 at pivot 104. The cushion rear lower link 80 is pivotally coupled to the seat riser 56 at pivot 106.

The cushion front upper link 82 is pivotally coupled to the cushion frame 62 at pivot 108. The cushion front upper link 82 is pivotally coupled to the cushion front lower link 84 at pivot 110. The cushion front lower link 84 is pivotally coupled to the seat riser 56 at pivot 112.

The cushion frame link 86 is pivotally coupled to the cushion frame 62 at pivot 114. The cushion frame link 86 is pivotally connected to the cushion center short link 88 and the cushion center long link 90 at pivot 116. Above pivot 116, a guide pin 118 connects the cushion frame link 86 to the arc slot 70.

The cushion center short link 88 is pivotally coupled to the circular plate 68 of seat riser 56 at pivot 120. The cushion center long link 90 is pivotally coupled to one end of the cushion four-bar link 92 at pivot 122. The opposite end of the four-bar link 92 is fixedly secured to the end of the reversing link 74 adjacent the seat riser 56 at pivot 98. Although depicted on the inboard side of outboard seat riser 56, the cushion frame link 86, the cushion center short link 88, the cushion center long link 90, and the cushion four-bar link 92 may be connected on the outboard side of outboard seat riser 56.

FIGS. 2-4 illustrate the reversible seat assembly 50 of the present disclosure in a plurality of seating positions. In FIG. 2, the seat assembly 50 is illustrated in a forward-facing seating position. Forward-facing is defined as the seat cushion 52 and seat back 54 positioned to support the seat occupant in a direction facing toward the front of the vehicle, as is commonly known. In the forward-facing seating position, the seat back 54 is in a first generally upright position with the lower end of the seat back 54 adjacent the rear end 60 of the seat cushion 52. The linkage 72 positions the seat cushion 52 in a first inclined position such that the front end 58 is spaced farther from the seat riser 56 than the rear end 60. The cushion front upper link 82 and the cushion front lower link 84 are approximately linearly aligned while the cushion rear upper link 78 and the cushion rear lower link 80 are folded together. The guide pin 118 is near the front end of the arc slot 70. The seat cushion 52 is locked via the seat back latch (not shown).

In FIG. 3, the seat assembly 50 is illustrated in a neutral position between the forward-facing and the rearward-facing seating positions. During the reversing process, the reverse link 74 drives the cushion four-bar link 92 to rotate the cushion center long link 90 and the cushion center short link 88 so that the guide pin 118 travels inside the slot 70 to lower the cushion height. This motion will trigger the rotation of the seat cushion 52 to a horizontal orientation by folding the cushion front upper link 82 and the cushion front lower link 84 together. As depicted in FIG. 3, in the neutral position, the guide pin 118 is near the center of the arc slot 70, and the seat cushion 52 is below the recliner bracket 66. Thus, there is clearance between the recliner bracket 66 and the seat cushion 52 to allow the seat back 54 to translate between the forward-facing and rearward-facing seating positions with the recliner bracket 66 spaced above the seat cushion 52.

In FIG. 4, the seat assembly 50 is illustrated in a rearward-facing seating position. Rearward-facing is defined as the seat cushion 52 and seat back 54 positioned to support the seat occupant in a direction facing toward the rear of the vehicle. As the seat assembly 50 continues from the neutral position towards the rearward-facing position, the reverse link 74 continues to drive the cushion four-bar link 92 to rotate the cushion center long link 90 and the cushion center short link 88 so that the guide pin 118 travels inside the slot 70 to raise the cushion height. The guide pin 118 is now near the rear end of the arc slot 70. In the rearward-facing seating position, the seat back 54 is in a second generally upright position with the lower end of the seat back 54 adjacent the front end 58 of the seat cushion 52. The linkage 72 positions the seat cushion 52 in a second inclined position such that the rear end 60 is spaced farther from the seat riser 56 than the front end 58. The cushion rear upper link 78 and the cushion rear lower link 80 are approximately linearly aligned while the cushion front upper link 82 and the cushion front lower link 84 are folded together. The seat cushion 52 is locked via the seat back latch (not shown).

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A reversible seat assembly for use in an automotive vehicle comprising:

a seat riser;

a seat cushion extending between a front end and a rear end, wherein the seat cushion comprises a cushion frame;

a cushion frame link extending between an upper end pivotally coupled to the cushion frame between the front and rear ends and a lower end that travels along an arc slot on the seat riser;

a seat back comprising a recliner bracket; and a plurality of reversing links extending between an upper end pivotally coupled to the recliner bracket and a lower end pivotally coupled to the seat riser;

wherein the lower end of the cushion frame link is positioned near an end of the arc slot when the seat back is adjacent the rear or front end of the seat cushion and the lower end of the cushion frame link is positioned near a center of the arc slot when the seat back is between the rear and front ends of the seat cushion.

2. The reversible seat assembly of claim 1 wherein the lower end of the cushion frame link is positioned near a front end of the arc slot when the seat back is adjacent the rear end of the seat cushion.

3. The reversible seat assembly of claim 2 wherein the lower end of the cushion frame link is positioned near a rear end of the arc slot when the seat back is adjacent the front end of the seat cushion.

4. The reversible seat assembly of claim 1 wherein the seat cushion is operatively coupled to the seat riser for movement between a first inclined position wherein the front end is spaced further from the seat riser than the rear end and a second inclined position wherein the rear end is spaced farther from the seat riser than the front end.

5. The reversible seat assembly of claim 4 wherein the seat cushion is in the first inclined position when the seat back is adjacent the rear end of the seat cushion.

6. The reversible seat assembly of claim 5 wherein the seat cushion is in the second inclined position when the seat back is adjacent the front end of the seat cushion.

7. The reversible seat assembly of claim 1 wherein the seat back comprises a second recliner bracket, the reversible seat assembly further comprising:

a second seat riser;

a second cushion frame link extending between an upper end pivotally coupled to the cushion frame between the front and rear ends and a lower end that travels along a second arc slot on the second seat riser; and a second plurality of reversing links extending between an upper end pivotally coupled to the second recliner bracket and a lower end pivotally coupled to the second seat riser;

wherein the lower end of the second cushion frame link is positioned near an end of the second arc slot when the seat back is adjacent the rear or front end of the seat cushion and the lower end of the second cushion frame link is positioned near a center of the second arc slot when the seat back is between the rear and front ends of the seat cushion.

8. The reversible seat assembly of claim 7 wherein the lower end of the second cushion frame link is positioned near a front end of the second arc slot when the seat back is adjacent the rear end of the seat cushion.

9. The reversible seat assembly of claim 8 wherein the lower end of the second cushion frame link is positioned near a rear end of the second arc slot when the seat back is adjacent the front end of the seat cushion.

* * * * *